J. C. SHAW.
MEASURING INSTRUMENT.
APPLICATION FILED APR. 7, 1917.
1,290,375.
Patented Jan. 7, 1919.
3 SHEETS—SHEET 1.
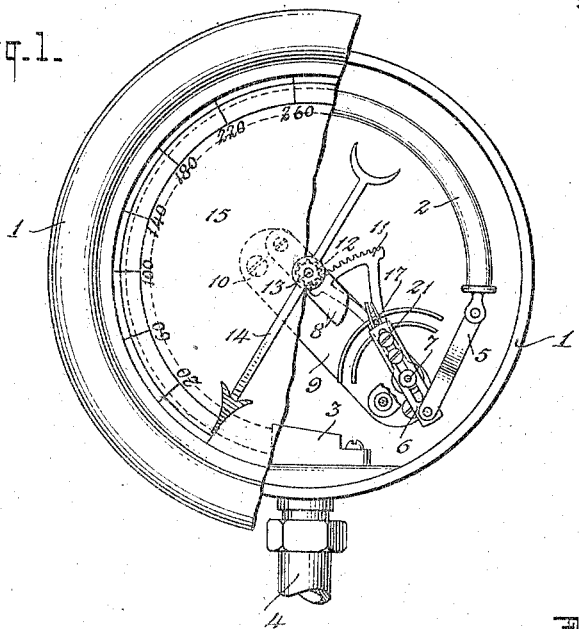
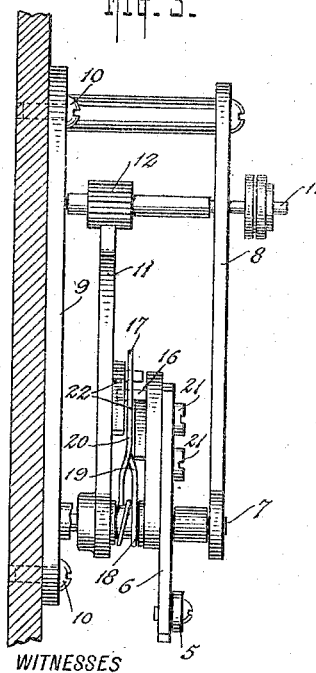
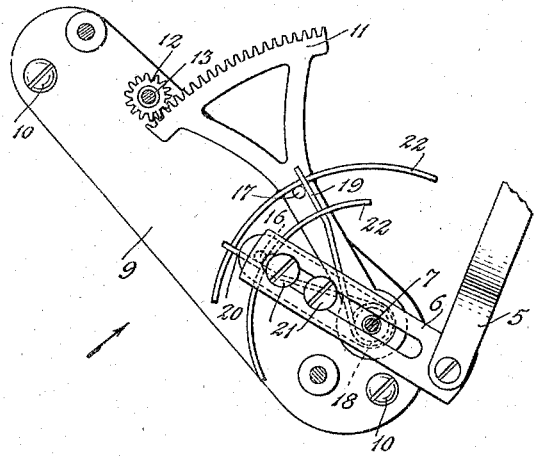
WITNESSES
George Du Bon
INVENTOR
JOHN C. SHAW
BY
ATTORNEYS

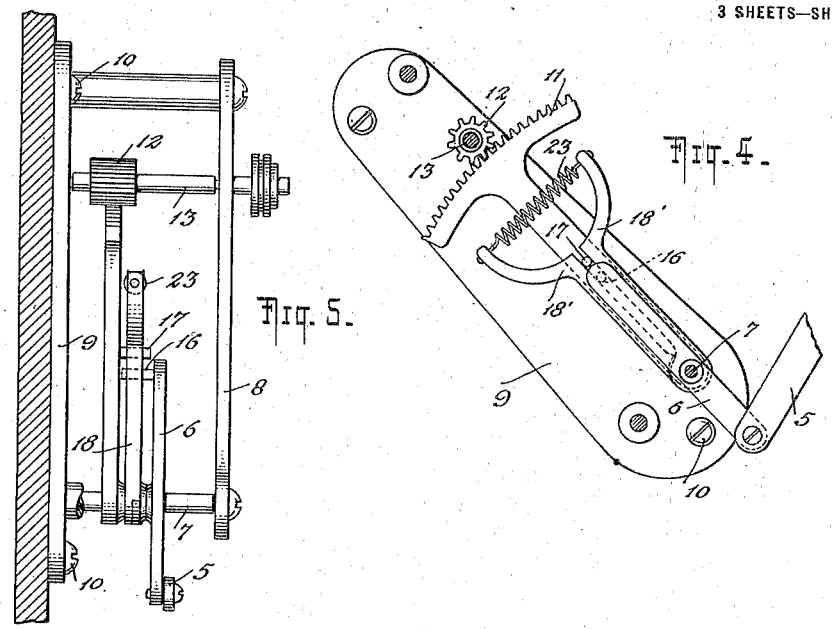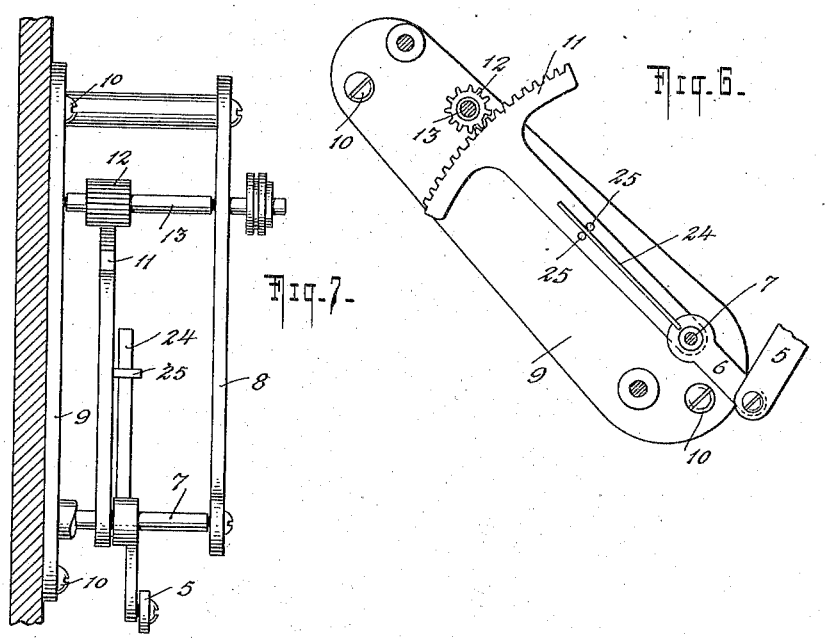

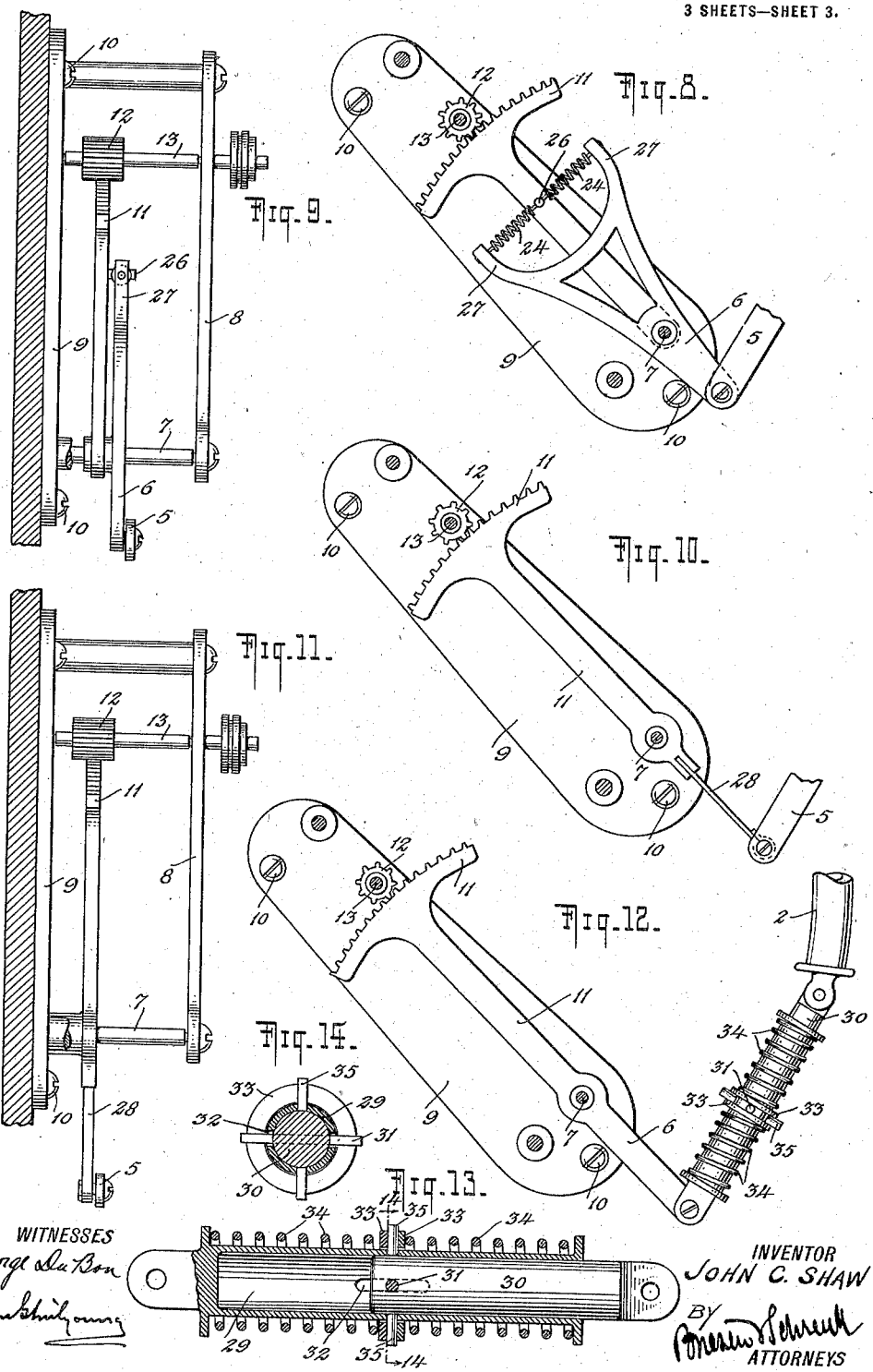

UNITED STATES PATENT OFFICE.

JOHN C. SHAW, OF BROOKLYN, NEW YORK, ASSIGNOR TO KELLER MECHANICAL ENGRAVING COMPANY, OF BROOKLYN, NEW YORK, A CORPORATION OF NEW YORK.

MEASURING INSTRUMENT.

1,290,375.      Specification of Letters Patent.      Patented Jan. 7, 1919.

Application filed April 7, 1917. Serial No. 160,350.

*To all whom it may concern:*

Be it known that I, JOHN C. SHAW, a citizen of the United States, residing in Brooklyn, Kings county, State of New York, have invented certain new and useful Improvements in Measuring Instruments, of which the following is a specification.

My invention relates to measuring instruments and especially to such instruments as are intended for indicating or recording values of some variable as, for example, electric pressure, current or energy, steam pressure, air pressure and the like, by means of an index or pointer movable (generally rotatably) with respect to a suitable dial or record blank, said pointer being controlled by and moving in correspondence with changes in the variable.

More particularly my invention relates to the connection between the indicating or recording index and the moving part from which it derives its motion.

I find my invention especially useful when applied to indicating and recording steam gages and, in the accompanying drawings and in the description which follows, I show and describe the invention as embodied in such a gage.

A very brief general description of my invention will perhaps enable the more extended detailed description which follows to be better understood.

In one of the best known forms of steam gage, for example, a Bourdon tube is held at one end in a suitable casing, the free end of the tube being connected by a link to a rotatable toothed sector whose teeth are in mesh with a pinion carrying the indicating pointer. The open, fixed end of the tube is connected with the steam supply whose pressure is to be measured or, if preferred, the tube is first filled with water and then connected with the steam supply. Or, the gage may be so located that it will naturally become filled with water, due to condensation in the normal operation of the gage. As long as the steam pressure remains fairly constant or, if variable, varies but slowly, the index will accurately follow the changes of pressure and the instrument will give satisfactory results. Should the steam pressure change with great suddenness, however, as is often the case under many conditions of steam practice, as all engineers know, the free end of the Bourdon tube is thrown in one direction or the other with great violence. Owing to the inertia of the parts the result of this very sudden movement is either a breaking off of the index from its pinion shaft, no matter how firmly it may be fastened, a shifting of the index upon the pinion shaft if it be held frictionally, or a stripping of the pinion or sector gear, or both.

I avoid the disadvantage just mentioned by interposing a yielding or elastic connection between the index and the moving member which controls the position of the index and is itself directly acted upon by the variables whose value is to be measured.

Referring to the drawings, Figure 1 represents, in plan view, a conventional indicating steam gage of the Bourdon type with a preferred form of my invention applied thereto; Fig. 2 is an enlarged plan view showing the principal operating parts used in Fig. 1, these parts being in the same relative position as shown in Fig. 1 except that the bar 6 has just been suddenly moved counterclockwise by the expansion of the Bourdon tube, insufficient time having elapsed for the inertia of the sector and pinion to be overcome; Fig. 3 is a side elevation of the parts shown in Fig. 2, taken in the direction of the arrow below said figure; Figs. 4 and 5 are views showing a modified form of the invention, corresponding to Figs. 2 and 3; Figs. 6 and 7 are views, showing another form of the invention, corresponding to Figs. 2 and 3; Figs. 8 and 9 are views, showing still another form of the invention, corresponding to Figs. 2 and 3; Figs. 10 and 11 are views, showing another form of the invention, corresponding to Figs. 2 and 3; Fig. 12 is a plan view, coresponding to Fig. 2, showing yet another form of the invention; Fig. 13 is an enlarged central section, part plan, of the special draw bar or link shown in Fig. 12 as connecting the Bourdon tube with the toothed sector, and Fig. 14 is a section taken along the line 14—14 of Fig. 13.

In the drawings, the casing 1 contains the Bourdon tube 2 attached to the casing at its open end 3 and having an inlet pipe 4 for connection to the steam supply whose pressure is to be measured.

The free end of the Bourdon tube is closed and carries a pivotally attached link 5 whose other end is attached to one end of a bar 6 mounted to rotate about a spindle 7 whose ends are set in top and bottom plates 8 and 9 of a frame attached by screws 10 to the back of the casing.

A toothed sector 11, independently rotatable about spindle 7 and located just below the bar 6 has its teeth in mesh with a pinion 12 mounted on a spindle 13 to the top of which is fixed an index 14 moving over a graduated dial 15.

The free end of bar 6 carries a downwardly projecting pin 16 while the sector 11 carries an upwardly projecting pin 17. These two pins extend nearly across the space between the bar and sector and are set at slightly different distances from the center of spindle 7 so that bar and segment may be independently rotated with reference to one another without interference between the pins.

A piece of spring wire 18 is wound around spindle 7 between bar 6 and sector 11 and has its two ends 19 and 20 disposed one on the one side of the two pins 16, 17, and the other on the other side, these ends being sprung in such directions that their tendency is to hold the two pins in the same radial line; the two spring arms or ends, 19, 20, are bent toward one another and then into the same plane, thus avoiding any couple tending to increase the friction upon the bearings about or on which the parts 6 and 11 move.

The bar 6 is extensible, its upper half being slotted and longitudinally slidable with respect to spindle 7 and two clamp screws 21 which thread into the lower half of the bar. The effective operating radius of the bar with respect to the Bourdon tube may therefore be altered so as to bring the divisions on the dial into accurate correspondence with the pressure valves as determined by the movement of the Bourdon tube.

Each opposed face of bar 6 and sector 11, preferably immediately adjacent to the pins 16 and 17 fixed thereto, carries a light thin strip 22 bent concentrically with spindle 7 the widths of the two strips being just slightly greater than the diameter of the wire constituting the spring ends 19, 20.

In operation, the free end of the Bourdon tube as it moves in response to the variations of steam pressure will, through the link 5, rotate the bar 6 about the spindle 7. Since the two spring ends 18 and 19 are constantly being pressed together against opposite sides of the two pins 16 and 17, the sector 11 will, ordinarily, move with bar 6 as one piece, thus correspondingly rotating pinion 12 and the index 14 affixed thereto. In case of any sudden variation of pressure, however, such as to cause the free end of the Bourdon tube to move violently, the inertia of the parts will permit the bar 6 to be moved independently with respect to the sector 11 against the resistance of either the spring end 18 or 19 as the case may be. This condition is shown in Fig. 2. Almost instantly, however, the inertia effect of the parts is overcome and the sector 11 will follow the movement of bar 6 under the influence of the spring end which presses against pin 17, fixed to said bar.

There is, hence, no excessive strain at any time tending to twist the index with respect to its spindle 13 or to break it away therefrom. Nor can there be any excessive and sudden strain produced between the teeth of sector 11 and pinion 12 tending to strip or injure said teeth. For all the more usual fluctuations of steam pressure, the movement of the end of the Bourdon tube is transmitted easily and gradually to the index 14 which moves in correspondence with the motion of the Bourdon tube and none of the parts are subjected to any undue strain. Should sudden movements of the Bourdon tube be caused by sudden variations of pressure, the first effect of this suddenly exerted force is entirely absorbed by the bar 6, which rotates in the one direction or the other, as the case may be, about the spindle 7. The index 14 will, however, promptly follow the motion of bar 6 by reason of the comparatively small and gently applied pressure due to the action of the spring 18 upon the pin 17 fixed in sector 11. The magnitude of the force exerted by the spring 18 will obviously depend upon the initial tension which has been given to the spring in assembling the instrument and also upon the arc of movement which is established between the bar 6 and sector 11 before said sector begins to "follow up." This arc will itself be dependent upon the suddenness and upon the magnitude of movement of the Bourdon tube.

In Figs. 4 to 13 inclusive, I have shown five different modifications of my invention. In all of these modifications the part which corresponds with bar 6 of Figs. 1 and 2 is of fixed length instead of being extensible as in the description just finished. This characteristic of extensibility can, however, easily be embodied in any of the modified structures as will be obvious to those skilled in the art.

The modified structure shown in Figs. 4 and 5 is substantially the same as that shown in Figs. 1 and 2 except that the spring 18 is equivalented by a pair of bars 18' loosely pivoted upon pivot 7 and having oppositely extended arms between which is stretched a spring 23. These bars are so bent that, except in the region of their pivotal attachment to spindle 7, they lie in the same plane and by means of the spring 23 are ordinarily drawn together so as to embrace between them, radially in line with spindle 7, the two pins 16 and 17.

The operation of this form of my invention is exactly the same as was set forth with reference to Figs. 1 and 2. Ordinarily, and for slow pressure fluctuations, the bar 6 when moved by the Bourdon tube through the link 5 carries with it the bars 18' and hence the sector 11, pinion 12 and attached index. Should the pressure fluctuations be violent and sudden the pin 16 attached to bar 11 will first act upon one or another of the bars 18' so as to move this bar away from its mate. This causes a stretching of spring 23 and a consequent movement of the remaining bar 18' and this bar, because of its pressure upon pin 17, will cause the sector 11 to follow the bar 11 and hence will move the index to its new position on the dial.

It should be noted that the structure shown in Figs. 1, 2 and 3, as well as that shown in Figs. 4 and 5 constitutes what may be termed a "self centering" device, inasmuch as the two pins 16 and 17 are always positively placed in line radially with spindle 7, thereby insuring that the position of rest of bar 6 with respect to sector 11, and hence with respect to the index, is always constant.

The embodiment of the invention shown in Figs. 6 and 7 is considerably simpler than the two embodiments previously described. Here the bar 6 has inserted into it, one end of a light straight thin spring strip 24 the free end of which is included between two pins 25 fixed to the upper face of the sector 11. These pins are set at the same radial distance from spindle 7 and at such a distance apart as to just include the spring 24 without binding.

In operation, a slow movement of bar 6, corresponding to a similar change of pressure in the Bourdon tube, causes an immediate and similar movement of the sector 11 and hence of the index. More sudden movements of the bar 6, corresponding to more sudden variations of pressure, result in an immediately bending, to a greater or less extent, of the spring 24. In response to this increased tension of spring 24 there will be an increased pressure exerted, in the one direction or the other, upon one or the other of the pins 25. Hence a corresponding movement of the sector 11 and of the index takes place as soon as the inertia effect of the parts has ceased.

A disadvantage of this form of the invention is that it is not "self centering", and there is a possibility that, in time, spring 24 will become permanently bent to a greater or less degree, thereby causing the index to indicate incorrectly.

The modification shown in Figs. 8 and 9 differs from that shown in Figs. 5 and 6, and just above described, only in that the spring 24 of Figs. 5 and 6 is replaced by a pair of opposed similar helical springs connected respectively between a pin 26 attached to sector 11 and arms 27 at one end of bar 6.

The operation of this form of my invention is exactly the same as that of the just previously described form shown in Figs. 6 and 7. This form of the invention, also, is not "self centering".

In the embodiment of my invention shown in Figs. 10 and 11, the end of sector 11 adjacent to the link 5 is connected to said link by a flat steel spring 28, one end of said spring being inserted into the bar and the other end of the spring having pivotal attachment with the end of the link.

The action of this form of the invention is substantially the same as that of the two forms shown in Figs. 6 and 7 and Figs. 8 and 9. The tendency of any movement of link 5 is to first bend the spring 28. If the movement of link 5 is slow, the bending of spring 28 will be practically negligible, that is to say, it will move substantially like a rigid bar rigidly attached to sector 11. If the movement of link 5 is sudden, however, spring 28 will bend correspondingly and the motion of sector 11 will similarly lag behind.

This form of the invention also is not self centering.

In the form of the invention shown in Figs. 12, 13 and 14 the resilient connection between index and Bourdon tube is made a part of the link 5. Referring to these figures this link here comprises a socket or sleeve 29 connected to the sector 11 and a plunger 30, slidable in said socket, connected to the Bourdon tube. A pin 31, fixed in the plunger, has its ends engaged in a slot 32 formed in the socket wall and lying between washers 33 which fit slidably over the socket. Springs 34 whose outer ends abut upon flanges at the outer ends of the socket have their inner ends resting against the outer faces of washers 33 so as to normally press them toward one another and against pins 35 fixed oppositely in the socket wall.

In the operation of this form of my invention, if the movement of the Bourdon tube is slow, the plunger end 30 of the connecting link will, through the pin 31 fixed thereto, one of the washers 33, the spring 34 in contact therewith and the socket flange at the other end of said spring 34, move the socket correspondingly and hence the index. If, however, the movement is sudden, the first effect will be the compression of one or the other of springs 34, depending upon the direction of movement of the plunger, the socket, sector and index tending to remain immovable. As soon as the inertia of the parts is overcome, however, the compressed spring 34 will expand until its washer 33 again rests upon pins 35 thereby moving the index to its proper position corresponding to the change which has taken place in the variable being measured.

The slot 32 prevents any relative rotation of the socket and plunger.

This form of my invention is also "self centering".

Having described my invention, I claim:—

1. In a measuring instrument, in combination with a common support, a pivoted index operating means, an index arranged to be driven positively by said operating means, a bar pivoted concentrically with said operating means but movable independently thereof and adapted to be actuated by and in correspondence with the variable to be measured, pins at different distances from the pivot fixed to index operating means and bar respectively, and resilient means acting upon both pins and tending to normally hold them in line with the pivot.

2. In a measuring instrument, in combination with a common support, a pinion adapted to carry an index, a pivoted toothed sector in mesh therewith, a bar pivoted upon the same axis as said sector but movable independently thereof said bar being adapted to be actuated by and in correspondence with the variable to be measured, a pair of pins fixed to sector and bar respectively and projecting from opposed faces thereof at different distances from the pivot, and resilient means connecting said pins and normally maintaining them in line with the pivot.

3. In a measuring instrument, in combination with a common support, a pinion adapted to carry an index, a pivoted toothed sector in mesh therewith, a bar pivoted upon the same axis as said sector but movable independently thereof said bar being adapted to be actuated by and in correspondence with the variable to be measured, a pair of pins fixed to sector and bar respectively and projecting from opposed faces thereof at different distances from the pivot, and a spring having ends which press toward one another on opposite sides of said pins so as to normally maintain said pins in line with the pivot.

4. In a measuring instrument, in combination with a common support, a pinion adapted to carry an index, a pivoted toothed sector in mesh therewith, a bar pivoted upon the same axis as said sector but movable independently thereof said bar being adapted to be actuated by and in correspondence with the variable to be measured, a pair of pins fixed to sector and bar respectively and projecting from opposed faces thereof at different distances from the pivot, and a length of spring wire supported upon the pivot the two ends of the spring being bent to press toward one another but held apart by the two pins with opposite sides of which the spring ends are normally in contact.

In testimony whereof I have hereunto set my hand.

JOHN C. SHAW.

Copies of this patent may be obtained for five cents each, by addressing the "Commissioner of Patents, Washington, D. C."